Oct. 2, 1934. S. UROUKOFF Re. 19,335

APPARATUS FOR CLEANING PIPES

Original Filed May 2, 1930 3 Sheets-Sheet 1

Inventor:
Steve Uroukoff
By Williams, Bradbury, McCaleb & Hinkle
Attys.

Oct. 2, 1934. S. UROUKOFF Re. 19,335

APPARATUS FOR CLEANING PIPES

Original Filed May 2, 1930 3 Sheets-Sheet 2

Inventor:
Steve Uroukoff
By Williams, Bradbury, McCaleb & Hinkle.
Attys.

Oct. 2, 1934. S. UROUKOFF Re. 19,335

APPARATUS FOR CLEANING PIPES

Original Filed May 2, 1930 3 Sheets-Sheet 3

Inventor:
Steve Uroukoff
By Williams, Bradbury, McCaleb & Hinkle
Attys.

Reissued Oct. 2, 1934 Re. 19,335

UNITED STATES PATENT OFFICE 19,335

APPARATUS FOR CLEANING PIPES

Steve Uroukoff, Harvey, Ill.

Original No. 1,866,870, dated July 12, 1932, Serial No. 449,192, May 2, 1930. Application for reissue July 5, 1934, Serial No. 733,883

6 Claims. (Cl. 225—12)

The present invention relates to a method and apparatus for cleaning pipes, and is particularly concerned with the cleaning of pipes, coils or fixtures used in cooling or dispensing apparatus for beer and other beverages.

The methods of cleaning of the prior art are not capable of cleaning pipes as effectively or expeditiously as is desirable, and the cleaning compound is not fully utilized by the prior methods, but is wasted by the discharge of the cleaning fluid comprising water and cleaning compound before it has performed the desired function and without actually loosening the slime, dirt, etc. in the pipes and flushing them clean.

One of the objects of the invention is the provision of an improved method of cleaning pipes, by means of which a greater agitation of the cleaning fluid is produced in the pipes and a better cleaning operation effected with a more economical use of cleaner.

Another object is the provision of an improved method of pipe cleaning, which is more expeditious and effective than the methods of the prior art.

Another object is the provision of an improved pipe cleaning apparatus which is peculiarly adapted to carry out the improved method of cleaning pipes expeditiously and effectively and which is applicable to the modern types of pipes, coils and fixtures used for beverages.

Another object is the provision of a pipe cleaning apparatus, which is economical in the use of cleaning compound, and which is adapted to give an indication of the condition of the cleaning fluid at any time and the condition of clearness of the pipes while the device is in operation, so that the fluid may be supplied in such quantities as are necessary to clean most effectively, and the operation may be continued without cessation until the pipes are effectively cleaned as indicated.

Other objects and advantages of the invention will be apparent from the following description and from the accompanying drawings, in which similar characters of reference indicate similar parts throughout the several views.

Referring to the drawings, of which there are three sheets:

Figure 1:
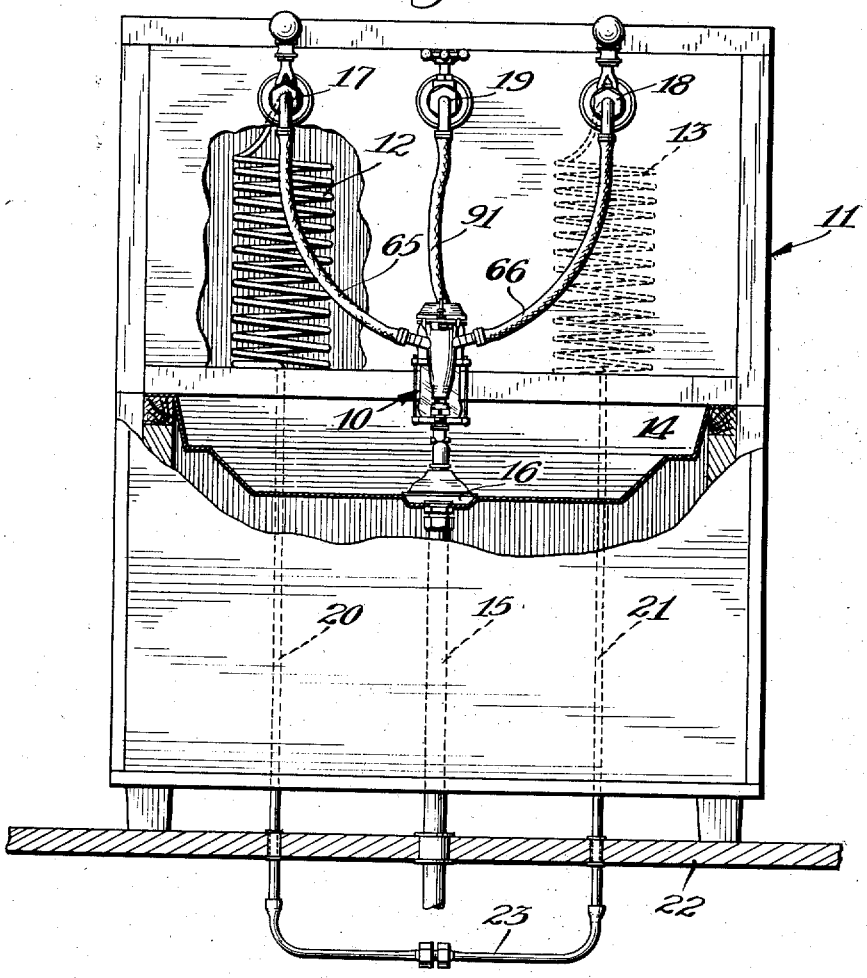
Fig. 1 is a front, elevational view in partial section, of the pipe cleaning apparatus in operation upon one form of installation for cooling and dispensing beverages.

Referring to Fig. 1, the pipe cleaning device is indicated in its entirety by the numeral 10, and the device is illustrated in connection with one of the types of beverage cooling boxes 11 in which a plurality of coils of tubing 12, 13 of copper or other non-corrodible metal are employed for cooling the beverage. The coil box 11 is usually provided with a sink 14 having a discharge conduit 15 connected with sink 14 through an enlarged opening 16, and the coil box is usually provided with a plurality of beverage faucets 17, 18 and a water faucet 19.

The water faucet 19 constitutes a source of supply of water under pressure, for use as a cleaning fluid with or without the cleaning compound, which is usually employed for cleaning beverage pipes, and which can be purchased on the open market, but if a water faucet does not happen to be located near the pipes, the operation can be accomplished by the use of a pressure pump and supply receptacle containing water.

The coils 12 and 13 either extend into the base of the coil box 11 where they are connected to kegs, barrels or other receptacles containing the beverage to be dispensed, or the coils may be provided with conduits 20, 21 extending downward through the floor 22 into the cellar, where they are connected to barrels or other containers containing the beverage under pressure.

The cleaning system illustrated in Fig. 1 is of peculiar advantage where the coils 12, 13 to be cleaned, extend down into the cellar so that both ends of the same coil are not readily accessible at the same point, in which case a plurality of the coils to be cleaned may be connected in series as illustrated in Fig. 1, and the cleaning apparatus applied to the faucets 17, 18 of the end coils in the series. While the system illustrated merely includes two coils, it should be understood that any number of coils may be connected in series, depending upon the water pressure available and the length of the coils, and the system illustrated may be extended by connecting two more coils in the same manner illustrated in Fig. 1, and extending a hose from the faucet 17 to the next adjacent faucet to provide a system of four coils in series.

In Fig. 1, the lower ends of the pipes 20, 21 have merely been disconnected from the respective barrels into which they ordinarily extend, and connected together by means of appropriate pieces of hose and couplings, diagrammatically indicated at 23. It should be understood, however, that the present method and apparatus is equally applicable, to the expeditious cleaning of one coil or a plurality of coils, and the cleaning of several coils at the same time is utilized for the purpose of performing the work with a minimum expenditure of labor and time.

Figure 2:
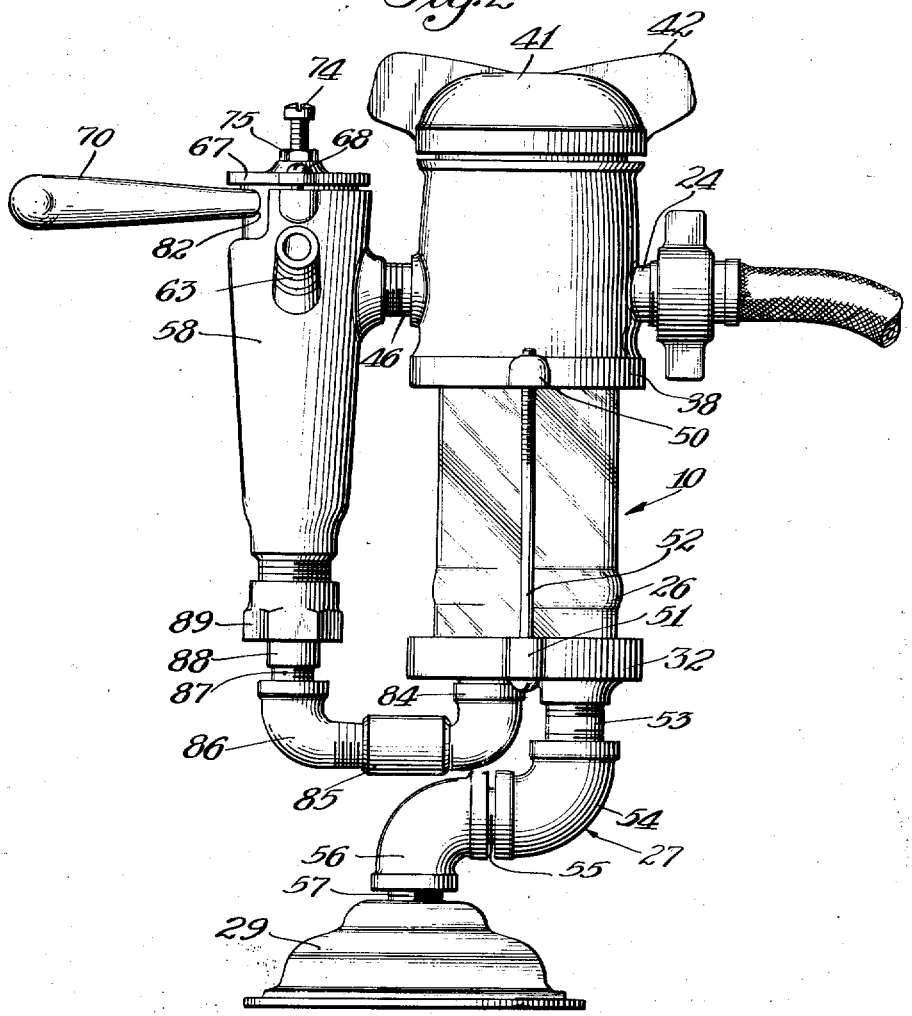
Fig. 2 is a side elevational view of the pipe cleaning device utilized in Fig. 1.
Figure 3:
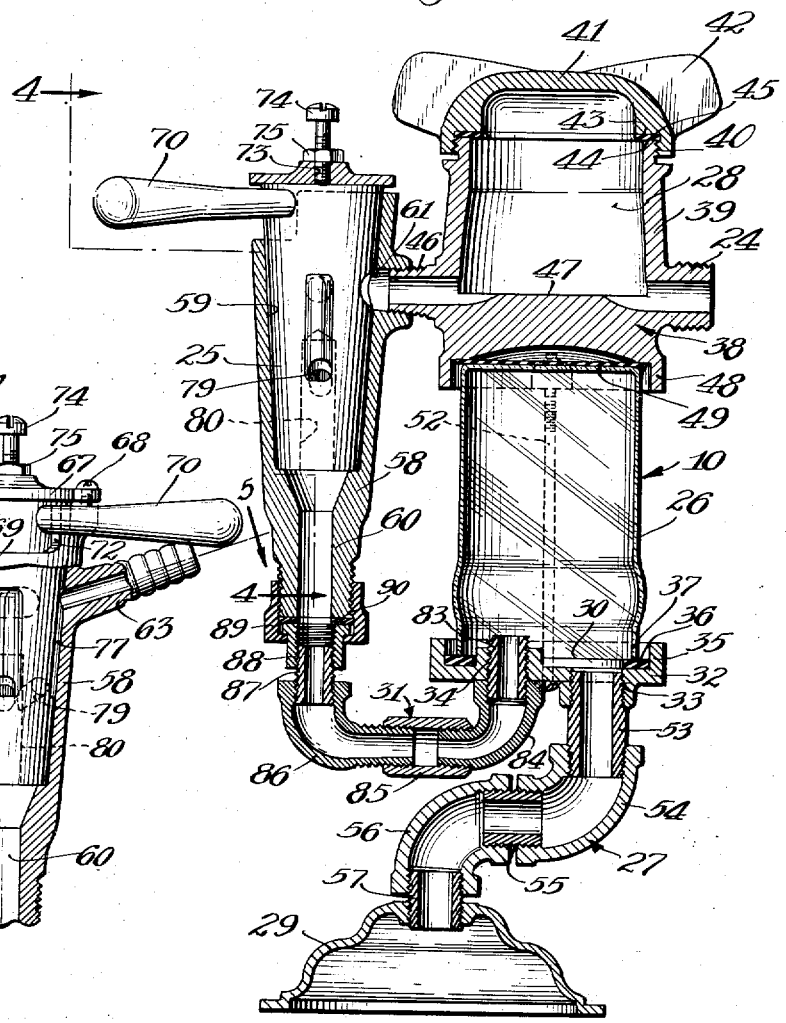
Fig. 3 is a vertical, medial, sectional view of the device shown in Fig. 2.
Figure 4:
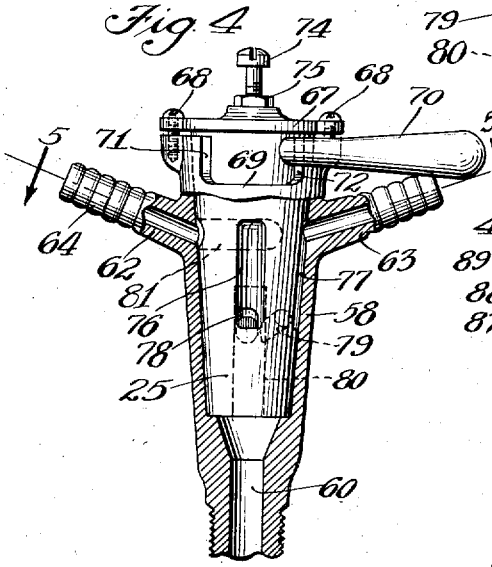
Fig. 4 is a view in partial section, taken on the plane of the line 4—4 of Fig. 3.

Referring to Figs. 2 to 4, the pipe cleaning device 10 preferably includes a supply conduit 24 which is provided with a control valve 25, an indicating device 26 for showing the condition of the cleaning fluid at any time, and a discharge conduit 27. The device also preferably includes a cleaning compound receptacle 28 interposed in the supply conduit 24 so as to be dissolved in the water passing through the supply conduit 24 to effect a better cleaning of the pipes, coils or fixtures.

The present method of cleaning pipes might be carried out by many different forms of apparatus, but the apparatus illustrated is peculiarly adapted to be manufactured economically and this apparatus has many advantages which are peculiar to the structure of the cleaning device.

The discharge conduit 27 is preferably formed with a supporting base 29 which may consist of a substantially bell-shaped receptacle adapted to cover an ordinary strainer in a sink to facilitate the discharge of the cleaning fluid after it has served its function, into the outlet pipe of the sink. The discharge conduit is preferably in direct communication with the indicating device 26, which consists of a transparent wall or receptacle through which the cleaning fluid may be observed after it has passed through the pipes to be cleaned but before it is discharged into the sewer. The transparent receptacle 26 may consist of a glass jar having an open end 30 which is in communication with the conduits 27 and 31. The cleaning device may be provided with a metal fitting 32 of substantially cylindrical form, having a threaded bore 33 for communication with the conduit 27 and a second threaded bore 34 for communication with conduit 31.

The fitting 32 is provided with an upwardly projecting annular wall 35 and with an annular rubber gasket 36 upon which the lower edge 37 of the glass jar 26 rests, and the fitting 32 is thus adapted to close the lower end of the jar 26 except for the conduits 27 and 31, which are in communication with the interior of glass receptacle 26.

The glass jar 26 may consist of an ordinary tumbler and it may be supported upon the fixture 32 by means of the metal body 38 which also forms the cleaning compound receptacle 28 and supply conduit 24. The metal body 38 comprises a substantially cylindrical member having an upwardly extending cylindrical wall 39 forming the chamber 28, the upper end of the wall 39 being provided with threads 40 for receiving complementary threads formed in a quickly detachable cap 41 having wings 42 for convenient manipulation.

The cap 41 is preferably formed with an annular shoulder 43 for engaging the upper edge 44 of wall 39 and gasket 45 of rubber or similar material is confined between the annular shoulder 43 and the upper edge 44 of the wall 39, thereby making the chamber 25 waterproof.

The chamber 28 is provided with the supply conduits 24, 46 which extend into the chamber adjacent the bottom 47 of the chamber so as to utilize all of the cleaning compound placed in chamber 38, and the conduits 24, 46 may be provided with threads for engagement with complementary parts in connecting the cleaning device to a water supply and to the valve 25.

The base of the metal body 38 is also provided with a depending annular wall 48 for confining the glass jar 26 in place and a rubber gasket 49 may be interposed between the tumbler 26 and metal body 38 for protecting the glass against breakage and permitting the metal jaws to resiliently clamp the glass in place.

The metal body 38 is preferably provided with laterally projecting lugs 50 at each side and the fixture 22 is likewise provided with laterally projecting lugs 51 at each side, the lugs 51 being provided with apertures for receiving the elongated bolts 52 and the lugs 50 being threaded to receive the threaded ends of the bolts 52. The bolts 52 draw the metal body 38 and fixture 22 together and assure the clamping of the tumbler 26 in place and the formation of a watertight joint at the gasket 36.

The cleaning device 10 is conveniently supported by the base 29 which also forms a part of the discharge conduit by providing a downwardly extending pipe 53 which is connected by an elbow 54 to a horizontally extending pipe 55 which is connected by an elbow 56 to a vertically extending pipe 57 which is secured to the base 29. The horizontally extending pipe 55 and elbows 54, 56 permit the location of base 29 at a central point which is substantially vertically downward from the center of gravity of the complete device 10 with respect to the base 29. The downwardly extending pipe 53 locates the elbows 54, 56 at a sufficient distance from the fixture 22 so as to make room for the conduit 31.

The fluid coming from the supply conduits 24, 46 is preferably controlled by a valve 25 which is capable of reversing the flow of cleaning fluid with respect to the coils 12, 13 or the single coil to which the cleaning device may be connected. The valve 25 is therefore provided with a valve casing 58 preferably consisting of a tapered metal member which is provided with an inner wall surface 59 of substantially frusto-conical form for receiving the valve body 25 of complementary frusto-conical form.

The valve casing 58 is provided at its lower end with a conduit 60 communicating with the interior of the casing and at one side with a conduit 61 which may be threaded to receive the threads of conduit 46 communicating with the source of supply.

Referring to Fig. 4, the valve casing 58 is also provided with a pair of laterally projecting conduits or pipe connections 62, 63 which may be formed with an exterior corrugated surface 64 for retaining the hose or conduits 65, 66 which are connected to faucets 17, 18 or to the ends of a single coil. The upper end of valve casing 58 may be provided with a cover 67 secured to the casing by a plurality of screw bolts 68 passing through the cover and threaded into threaded bores in the casing 58 and the upper wall of casing 58 is formed with a relatively wide slot 69 for receiving the actuating member or handle 70 of valve 25 and permitting the necessary movement of the valve.

The side walls 71, 72 of slot 69 provide stops for limiting the movement of valve 25 and definitely locating the passages of valve 25 in proper registration with the conduits 61, 62, 63.

The valve body 25 comprises a substantially frusto-conical metal member adapted to fit closely in the valve casing 58 and provided with a plurality of passages or conduits for directing the flow of the water in either direction through a pipe 13. In order to assure a watertight connection between the valve body 25 and its casing, the cover plate 67 may be provided with a threaded bore 73 axially located with respect to valve body 25 and the bore 73 is adapted to receive a set screw 74 having a lock nut 75, in such manner that a predetermined amount of pressure may be brought to bear upon the upper end of valve body 25, forcing the tapered valve body into close engagement with the walls of casing 58.

The valve body 25 is provided with a pair of longitudinally extending conduits or slots 76, 77 in the outer surface of the frusto-conical body 25, and the slots 76, 77 each communicate at their lower end through conduits 78, 79 with an axially located conduit 80 communicating with the conduit 60 at the lower end of valve casing 58.

In the present embodiment, the pipe connections or conduits 63, 64 are located at opposite sides of the valve casing 58 or diametrically opposite to each other, and the amount of movement permitted to the handle 70 is such that when the conduit 77 communicates with conduit 63 as in Fig. 4, the conduit 76 is displaced with respect to conduit 62 as in Fig. 4, and consequently the slots 76, 77 are substantially 45° apart on the circumference of the frusto-conical valve body 25. This spacing of the conduits or passages in the valve body may be varied provided the spacing is such that the proper conduits are opened and closed as described herein.

Figure 5:
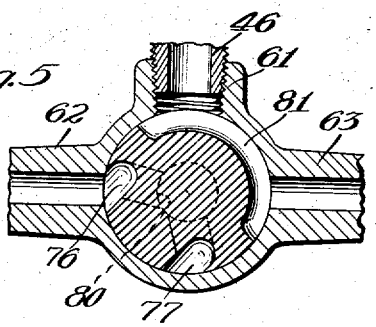
Fig. 5 is a horizontal, sectional view taken on the plane of the line 5—5 of Fig. 4, with the parts of the valve in another position.

The valve body 25 is also provided with a transversely extending slot or conduit 81 located in the rear side of the valve body 25 with respect to handle 70 for cooperation with conduit 61. The length of slot 81 is such that when the parts are in the position of Fig. 4, the conduit 61 is in communication with conduit 62 through slot 81, and when the parts are in the position of Fig. 5, the conduit 61 is in communication with conduit 63 through slot 81.

The handle may consist of a cast metal member fixedly secured in valve body 25 by a drive fit in the transverse bore 82 or by providing the handle and bore with complementary threads.

The lower end of valve casing 58 communicates with conduit 31 and consequently with the glass indicating chamber 26 through any convenient form of piping. For instance, a short threaded pipe 83 is threaded into bore 34 of fixture 22 and connected with an elbow 84. Elbow 84 is connected by a coupling 85 to a second elbow 86 and elbow 86 by a short threaded pipe 87 to a coupling 88 which is secured by a lock nut 89 to the lower end of valve casing 58. Gaskets 90 may be provided at any points in the couplings or pipes where it is necessary to assure a watertight joint.

The assembly of the foregoing parts will be evident from the description and drawings, and the operation of the cleaning device is as follows.

The supply conduit is connected to a source of water supply under pressure, such as the faucet 19, by means of hose 91 after the cleaning compound chamber 28 has been supplied with any standard type of cleaning compound to an amount necessary for the cleaning operation desired. The pipe connection conduits 62, 63 are then connected to the ends of a single coil pipe or fixture to be cleaned, and the water is turned on at the faucet 19.

The water then passes through supply conduit 24 and cleaning compound chamber 28 into valve chamber 58. Assuming the parts of the valve are in the position of Figs. 3 and 4, the water passes through conduit 46, conduit 61, slot 81, pipe connection conduit 62, hose 65, pipe 12, pipe 20, hose 23, pipe 21, pipe 13, faucet 18, hose 66, pipe connection 63, slot 77, conduit 79, conduit 80, conduit 60, conduit 31, glass tumbler 26, conduit 27, base 29 into the sewer pipe 15.

The cleaning compound is dissolved in or carried with the water into the pipes 12 and 13, and the cleaning fluid surges through the pipes 12 and 13 into the indicating device 26, where it can be observed that the water has carried with it dirt, slime, etc. from the pipes 12, 13. When the dirty water is observed in glass 26, the valve handle 70 is moved from the right in Fig. 4, towards the left, thereby moving the valve parts to the position of Fig. 5. This moves the slot 77 out of registry with the pipe connection 63, and slot 81 out of registry with pipe connection 62, but moves the slot 76 into registry with pipe 62 and slot 81 into registry with pipe 63. The slot 81 is in continuous connection with conduit 46.

Beginning at the conduit 46, it will be observed that the water will then pass through slot 81 to conduit 63, and through the coils 13 and 12 in the opposite direction, thence through conduit 62, slot 76, conduit 78, conduit 60, conduit 31, glass 26, conduit 27 to the sewer pipe 15.

In other words, the direction of flow of the cleaning fluid through the pipes 12 and 13 is immediately reversed and the surge of cleaning fluid through the pipes 12 and 13 is brought to a stop by means of the water pressure and the water caused to move in the opposite direction. This reversal of flow occupies an appreciable lapse of time so that the dirty water which has been observed in glass 26 drains out through conduit 27 into sewer pipe 15 and a very short time later, the dirty cleaning fluid again appears in the indicating device 26, indicating to the operator that a complete reversal has taken place in the direction of flow and showing the condition of the cleaning fluid at this time.

The valve 25 is then reversed a sufficient number of times to clean the pipes effectively, and if desired, the reversal of flow may be made periodic or a short time may be permitted to elapse between the actuations of the valve handle 70 to permit the dirty or spent cleaning fluid to flow out of the system and cause a fresh supply of cleaning fluid to flow into the system. In other words, the device may be operated so as to cause a positive surging back and forth, or positive agitation of the cleaning fluid in the pipes with only a slight amount of waste, such as is required to give a positive indication of the reversal of flow or a new supply of cleaning fluid may be drawn into the pipes as often as desired.

Ordinarily from five to ten reversals of the valve handle are sufficient to effect a thorough cleaning of any ordinary beverage pipe, after which the handle may be left in one position until the cleaning compound has been washed out and the pipes may be flushed out by means of a supply of clear water. The handle may then be pushed back and forth to produce a positive agitation of the clear water in the coils and effect a thorough flushing out of the cleaning compound, after which the water supply may be shut off at the faucet 19 and the clean coils placed in their former condition.

The present method of cleaning beverage pipes will be evident from the foregoing description of the operation of the apparatus, but the method is capable of being carried out by a number of different forms of apparatus, only one of which is disclosed herein. The method preferably includes the connection of the pipes in series, but may also be practiced upon single pipes, and the series connection is only employed where it is possible to clean several pipes at once, or where the ends of the pipes are inconveniently located at points remote from each other.

The method includes the filling of the pipe with cleaning fluid under pressure and reversing the flow of the cleaning fluid in the pipes to effect a positive agitation of the fluid and a cleaning of the pipe. The flow is preferably reversed a plurality of times to cause the water under pressure to surge through the pipe in opposite directions and facilitate a better cleaning.

If desired, the reversal may be made periodic without the use of an indicating device, since the operator may learn the length of time required for reversal and the mode of manipulation of the valve to produce positive agitation without the necessity for an indication.

The method preferably includes the forcing of the cleaning fluid through the pipe until the flow indication is observed so that the condition of the cleaning fluid and consequently the condition of cleanliness of the pipes may be observed at any time, after which the flow may be reversed rapidly or periodically until the pipe is clean and additional cleaning fluid may be supplied if desired during the cleaning operation, by merely permitting a longer period of time to elapse between the reversals of the valve.

After positive cleaning has been effected by the surging and agitation of the liquid, the clean fluid is preferably permitted to flow out and the pipes flushed by permitting fresh water to flow through them or effecting a positive agitation of the fresh water in the pipes.

The apparatus need not necessarily be arranged to effect a shut-off of the flow during the movement of the valve from one position to the other, and it is sufficient that the valve effect a reversal with or without a shutting off of flow at the intermediate position of the valve.

While I have illustrated a preferred embodiment of the apparatus and the preferred practice of the method, many modifications may be made without departing from the spirit of the invention, and I do not wish to be limited to the precise details of construction set forth, nor to every detail of the method described, but desire to avail myself of all changes within the scope of the appended claims.

I claim as my invention:

1. A pipe cleaning apparatus comprising a chamber for cleaning compound formed with a cover and a socket in its lower surface, a supporting plate formed with a similar socket and having a pair of conduits passing through said plate, a tumbler communicating with said conduits and having its ends secured in said sockets, the first of said conduits passing through said compound chamber into said tumbler and the second of said conduits leading from said tumbler into a discharge opening.

2. A pipe cleaning apparatus comprising a chamber for cleaning compound formed with a cover and a socket in its lower surface, a supporting plate formed with a similar socket and having a pair of conduits passing through said plate, a tumbler communicating with said conduits and having its ends secured in said sockets, the first of said conduits passing through said compound chamber into said tumbler and the second of said conduits leading from said tumbler into a discharge opening, said second conduit terminating in a bell shaped member adapted to cover a drain opening in a sink and said bell shaped member forming a base for said apparatus.

3. A pipe cleaning apparatus comprising a chamber for cleaning compound formed with a cover and a socket in its lower surface, a supporting plate formed with a similar socket and having a pair of conduits passing through said plate, a tumbler communicating with said conduits and having its ends secured in said sockets, the first of said conduits passing through said compound chamber into said tumbler, the second of said conduits leading from said tumbler to a discharge opening, said first conduit having a frusto-conical enlargement formed with oppositely extending pipe connections, a body rotatably mounted in said enlargement and having grooves for alternately connecting said cleaning compound chamber with said pipe connections.

4. A pipe cleaning apparatus comprising a chamber for cleaning compound formed with a cover and a socket in its lower surface, a supporting plate formed with a similar socket and having a pair of conduits passing through said plate, a tumbler communicating with said conduits and having its ends secured in said sockets, the first of said conduits passing through said compound chamber into said tumbler, the second of said conduits leading from said tumbler to a discharge opening, said first conduit having a frusto-conical enlargement formed with oppositely extending pipe connections, a body rotatably mounted in said enlargement and having grooves for alternately connecting said cleaning compound chamber with said pipe connections, said body being frusto-conical in shape and forcing multiplying means for urging said body into said frusto-conical enlargement.

5. A pipe cleaning apparatus comprising a cleaning compound chamber of substantially cylindrical shape and having conduits extending from opposite sides thereof, a cover for said chamber, said chamber being formed with a socket in the side opposite from said cover, a second chamber carried by one of said conduits and communicating therewith, said second chamber having oppositely extending pipe connections and a downwardly extending conduit, a supporting plate having a socket formed in one side and having conduits communicating with said socket, one of said conduits being said downwardly extending conduit, a transparent chamber communicating with said latter conduits and clamped in said sockets, one of said latter conduits being curved to have its lower end centrally located with respect to said apparatus, and a base carried by said latter conduit for supporting said apparatus.

6. A pipe cleaning apparatus comprising a cleaning compound chamber of substantially cylindrical shape and having conduits extending from opposite sides thereof, a cover for said chamber, said chamber being formed with a socket in the side opposite from said cover, a second chamber carried by one of said conduits and communicating therewith, said second chamber having oppositely extending pipe connections and a downwardly extending conduit, a supporting plate having a socket formed in one side and having conduits communicating with said socket, one of said conduits being said downwardly extending conduit, a transparent chamber communicating with said latter conduits and clamped in said sockets, one of said latter conduits being curved to have its lower end centrally located with respect to said apparatus, and a base carried by said latter conduit for supporting said apparatus, said base comprising a bell shaped member adapted to substantially cover a drain in a sink.

STEVE UROUKOFF.